United States Patent [19]

Slaats et al.

[11] 3,996,896

[45] Dec. 14, 1976

[54] REARING CAGES

[75] Inventors: Joris Slaats, De Pinte; Jan Vandenbogaerde, Waarmaarde, both of Belgium

[73] Assignee: N.V. Bekaert S.A., Zwevegem, Belgium

[22] Filed: Jan. 24, 1975

[21] Appl. No.: 543,937

[30] Foreign Application Priority Data

Feb. 14, 1974 United Kingdom .............. 6776/74

[52] U.S. Cl. .................................. 119/17; 119/22; 119/82

[51] Int. Cl.² .................. A01K 29/00; A01K 31/00

[58] Field of Search ............. 119/9, 11, 20, 26, 30, 119/31, 15, 17, 18, 21, 19, 49, 12, 28, 29, 97 AR, 82, 97 R, 22

[56] References Cited

UNITED STATES PATENTS

| | | | |
|---|---|---|---|
| 553,902 | 2/1896 | Dickey | 119/17 |
| 1,771,492 | 7/1930 | Karlson | 119/17 |
| 3,253,577 | 5/1966 | Lund | 119/82 |
| 3,465,722 | 9/1969 | Duff | 119/19 |

*Primary Examiner*—Louis G. Mancene
*Assistant Examiner*—Peter K. Skiff
*Attorney, Agent, or Firm*—Edward J. Brenner

[57] ABSTRACT

Apparatus for use in rearing and transporting small animals comprising (1) one or more rearing cages, each of which has a floor including at least two substantially coplanar floor panels which are removable from the cage while still carrying one or more animals, (2) a structure for receiving and supporting a floor panel when the latter is first removed from the rearing cage, such structure including underneath support means for the floor panel as well as side wall members for confining animals to the floor panel, and (3) a walled and roofed cage member which can be placed over and connected to said floor panel to form a transport cage.

9 Claims, 2 Drawing Figures

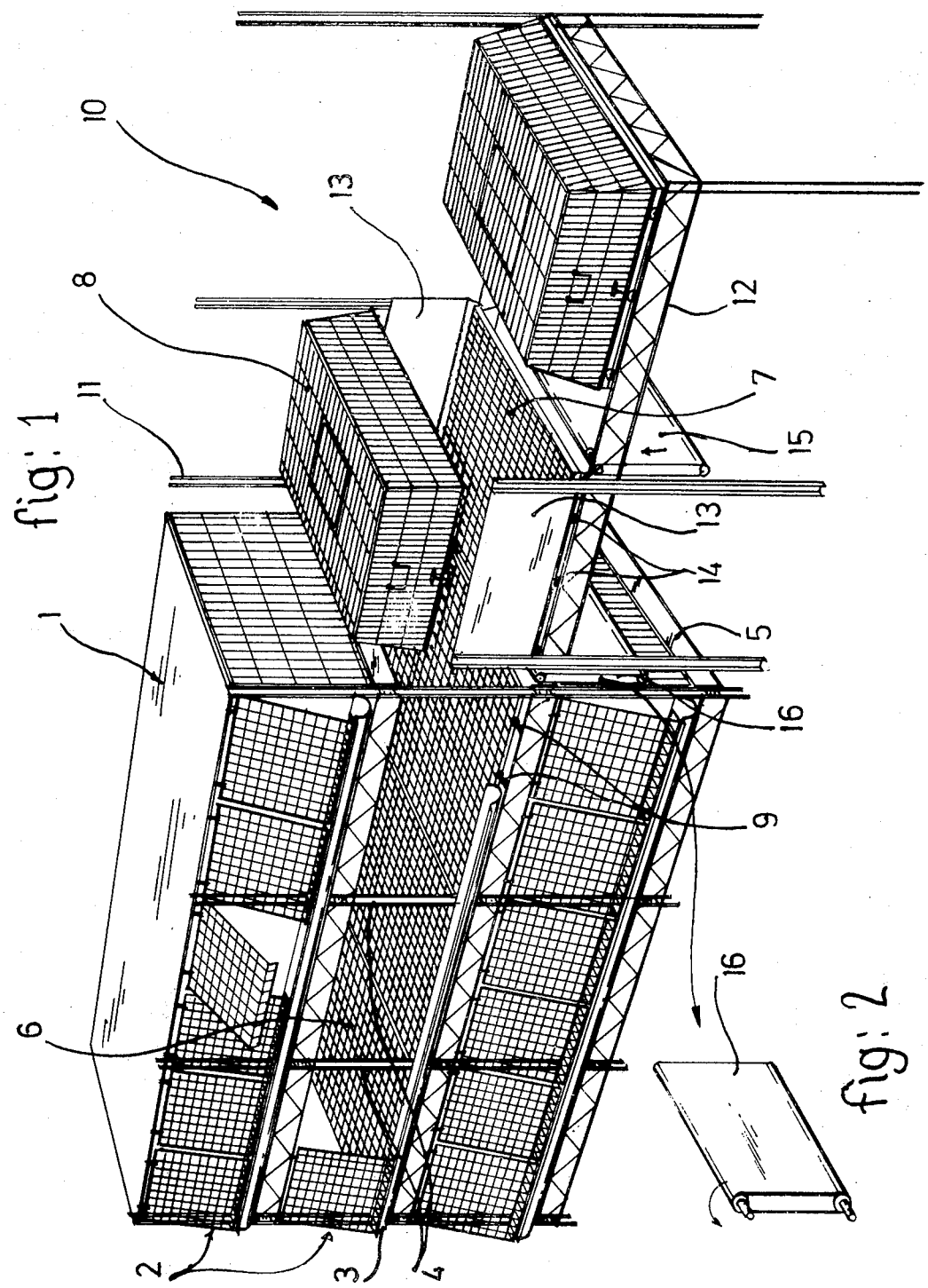

REARING CAGES

This invention relates to cages for use in rearing small animals such as chickens.

Such cages are known in the form of a battery consisting of several tiers, for instance three or more tiers, wherein each tier comprises several cages. Each cage is constructed as a unit which can be removed from the battery with the animals inside it for transport or other purposes. An important advantage of these known batteries follows from the fact that the animals are always confined in a cage and can therefore be transported without it being necessary to handle them directly, thus avoiding damage such as broken legs or wings and also saving time.

However, a disadvantage of these batteries is their high cost price. Another disadvantage follows from the fact that each animal is restricted in its movement to its own cage, which restriction leads to a lower quality of the slaughtered animals.

According to the present invention there is provided a cage for use in rearing small animals such as chickens, whose floor comprises at least two substantially coplanar floor panels each of which is removable from the cage whilst carrying one or more animals.

Such an arrangement is cheaper than the batteries previously mentioned, because it is no longer necessary to keep a sufficient number of individual cage units permanently at the rearing location, but only to replace each floor panel as it is removed from transportation. Separate walled and roofed cage members will be provided for association with the floor panels to form cage units for transportation. Furthermore the arrangement reduces the aforementioned restriction on movement of the animals being reared, because each animal can now move over a floor made up of at least two floor panels the area of each of which may be equal to that of one known cage unit.

An embodiment of the invention will now be described by way of example and with reference to the accompanying drawings, in which:

FIG. 1 is a perspective view of an apparatus for use in rearing and transporting small animals such as chickens, embodying the invention; and FIG. 2 is a detail of a wall member forming part of the apparatus of FIG. 1.

Referring to the drawings, the apparatus 1 comprises three cages 2. Clearly it would be possible to have more than three cages. Each cage 2 is provided with water and food troughs 3 carried by uprights 4 of the structure. A panel 5 runs the whole length of each cage 2 below its floor to receive the droppings therefrom and each panel 5 is provided with a scraping device or other means for cleaning it. It is alternatively possible to provide a conveyor belt instead of the panel 5 with the scraping device.

The most important feature of the apparatus is that the floor 6 of each cage 2 consists of three separate floor panels 7 which can be moved out of the apparatus to form the floor of a transport cage 8. Clearly different systems can be used for obtaining movement of the panels 7 in and out of the cages 2; in this embodiment guide ways 9 consisting of rollers are provided at each side of each cage 2, so that the panels 7 can slide over the rollers. Each panel 7 is preferably made of welded wire mesh, which is embedded or coated with a plastics material, the openings of the mesh being large enough for the droppings to pass through to the panel 5. Each cage 2 is provided with two end or side walls, a rear wall and a front wall. As can be seen from FIG. 1, the front wall comprises several flaps which can rest against the food trough or be moved into the cage itself. During the rearing period, for instance of seven weeks, all the animals in each cage 2 can now move over the whole floor surface of this cage, whose area is about 3 times that of a known cage unit.

When the animals are ready for slaughtering or for transport to the abattoir a structure 10 is placed alongside the apparatus 1. The structure 10 comprises several vertical channels 11, up and down which a platform 12 can be moved. For clarity of FIG. 1 the upper parts of the front channels are omitted. The platform 12 is placed so that the floor of a cage 2 is in alignment with this platform. The platform 12 is provided with two side walls 13 whose spacing is practically equal to the width of a cage 2, and of a floor panel 7. This platform 12, which is arranged to provide underneath support for each of the floor panels 7, has two rows of rollers 14 which come in alignment with the rollers 9 of each cage 2. Then a movable end wall 15 is moved upwards so that the side walls 13 and this end wall 15 form a container with three walls. Then the end wall of the cage 2 is taken away and one panel 7 with the animals thereon is moved into this container. A second movable wall 16 is then moved upwards so that four walls are now provided around this panel 7. The next operation consists in placing a transport cage member 8 in the form of an inverted basket on the floor panel 7. Each basket 8 and each panel 7 are provided with cooperating self-locking means so that the basket 8 is firmly attached to the panel 7. Then the walls 15 and 16 are moved away and the cage 8 is moved to the next station on the platform 12, from which station the cages 8 filled with the animals are led, for instance by means of a conveyor belt, to a succeeding location. It is clear that the whole operation can then be repeated for the next floor panel 7, and so on. In this way all the animals are loaded into the cages 8 without being handled directly.

A great advantage follows from the fact that now only one set of cages 8 is necessary for a considerable number of apparatuses 1. With known battery cages, on the other hand, all the cages are immobilized during the whole rearing period. Now the cages 8 are only used during loading and transport of the animals and thus the same set of cages 8 can be used many times for a number of apparatuses, with a considerable saving in cost.

In FIG. 2 the side wall 16 is shown in detail. This wall 16 is a conveyor belt formed by an endless web which rotates when moved upwards so that animals standing on the border line between the open cage 2 and the platform 12 are moved either into the container or back into the cage 2.

The cages 8 are tapered as shown, to permit them to be nested when out of use. These cages 8 can be formed of any suitable material, for instance welded mesh or plastics material.

It should be clearly understood that although the illustrated embodiment of the invention is an apparatus comprising a stack of three cages which are built together and are not readily separable from one another, the scope of the invention extends also to individual cages and to apparatus comprising a stack of such cages which are readily separable from one another.

What we claim is:

1. Apparatus for use in rearing and transporting small animals comprising
    one or more rearing cages, each of which has a floor including at least two substantially coplanar floor panels each of which is removable from the cage while still carrying one or more animals,
    a structure for receiving and supporting a floor panel when the latter is first removed from said rearing cage, said structure including underneath support means for said floor panel and side wall members for confining animals on the sides of said structure to said floor panel, and
    a side-walled and roofed cage member in the form of an inverted basket adapted to be placed over and connected to said floor panel to form a transport cage.

2. An apparatus as claimed in claim 1 wherein each of said floor panels is removable from the corresponding rearing cage by movement of the panel substantially in the plane of the said floor.

3. An apparatus as claimed in claim 2 wherein the said floor panels are arranged in a single row and are removable in turn by movement parallel to the length of said row.

4. An apparatus as claimed in claim 3 wherein said floor panels are mounted on rollers.

5. An apparatus as claimed in claim 1 wherein said floor panels are made of wire mesh.

6. An apparatus as claimed in claim 1 comprising at least two rearing cages arranged as a stack.

7. An apparatus as claimed in claim 1 wherein said underneath support means is arranged to provide underneath support for each floor panel while it is being removed from its corresponding rearing cage.

8. An apparatus as claimed in claim 1 wherein one of said side wall members is vertically movable in its own plane into an operative position in which it separates said structure from a rearing cage and out of said operative position to permit movement of one of said floor panels with an animal thereon from said cage to said structure.

9. An apparatus according to claim 8 wherein said vertically movable side wall is an endless web mounted on rollers and arranged to rotate as it is raised into its operative position in such manner as to urge animals which it contacts back into the adjacent cage.

* * * * *